United States Patent
Schwab et al.

(10) Patent No.: US 6,871,281 B2
(45) Date of Patent: Mar. 22, 2005

(54) METHOD AND SYSTEM FOR SENDING DATA BETWEEN COMPUTERS USING A SECURE PIPELINE

(76) Inventors: Thomas J. Schwab, 7137 Manor House Dr., Warrenton, VA (US) 20187; Hillel Dov Steinberg, 2402 Glenmore Ter., Rockville, MD (US) 20850; Eric Lee Franklin, 1519 Colder La., Dale City, VA (US) 22193

( * ) Notice: Subject to any disclaimer, the term of this patent is extended or adjusted under 35 U.S.C. 154(b) by 853 days.

(21) Appl. No.: 09/790,647

(22) Filed: Feb. 23, 2001

(65) Prior Publication Data

US 2002/0120865 A1 Aug. 29, 2002

(51) Int. Cl.[7] .............................. H04L 9/00
(52) U.S. Cl. .................. 713/187; 713/200; 713/201
(58) Field of Search ............................... 713/182, 200, 713/201

(56) References Cited

U.S. PATENT DOCUMENTS

| | | | | |
|---|---|---|---|---|
| 6,147,996 A | * | 11/2000 | Laor et al. | 370/394 |
| 6,157,965 A | * | 12/2000 | Mohammed et al. | 710/8 |
| 6,160,808 A | * | 12/2000 | Maurya | 370/389 |

* cited by examiner

*Primary Examiner*—Thomas R. Peeso
(74) *Attorney, Agent, or Firm*—Steptoe & Johnson LLP (57) ABSTRACT

A method for transmitting data is provided. The method includes receiving, from upstream in the path, a first data packet containing at least data and an associated first transmission protocol header; disabling the association between the first transmission protocol header and the data; associating a second transmission protocol header with the data, the second transmission protocol header being independent from the first transmission protocol header; and sending, downstream in the path, a second data packet containing at least the data and the associated second transmission protocol header. The first protocol is preferably different from the second protocol.

27 Claims, 11 Drawing Sheets

METHOD AND SYSTEM FOR SENDING DATA BETWEEN COMPUTERS USING A SECURE PIPELINE

BACKGROUND OF THE INVENTION

1. Field of the Invention

The present invention relates to a system and method for sending information between nodes. More specifically, the present invention relates to a system and method for sending electronic information between computers and/or networks over a secure pipeline in a manner that limits access between the computers and/or networks.

2. Discussion of Background Information

As is known to those of skill in the art, the movement of a data within a system governed by a particular protocol will attach or otherwise associate the data with a transport protocol header (TPH). Such a TPH will be consistent with the controlling protocol and contain at least sufficient information to forward the data from its source to its destination. Depending on the particular protocol, the TPH may include multiple headers; by way of non-limiting example, for the TCP/IP suite protocol, the TPH would include both IP and TCP headers. Manipulation of a TPH is a way in which crackers attempt to gain unauthorized access to a restricted computer or computer network.

The most common type of network security is a firewall, which prevents (or perhaps more correctly, limits) unauthorized access to or from a private network. The firewall may have several security measures, such as packet filtering, an application gateway, circuit-level gateway, a proxy server, etc. The firewall may include hardware, software, or a combination thereof. Notwithstanding the strength (or "height") of a firewall, it is known that they are not impregnable. Several recent incidents of computer crackers breaking into high security public and private computer databases demonstrate that even the strongest of firewalls can be bypassed.

A weakness of the firewall approach is that both sides of the firewall tend to operate according to the same communication and transport protocols. For example, both the system protected by the firewall and an external system may operate using the TCP/IP protocol. To the extent that a cracker is able to breach or otherwise defeat the firewall, then manipulation of the TCP/IP TPH can be used to gain unauthorized access to the computer network.

In view of these potential vulnerabilities, many private and public agencies place sensitive electronic data on computers or computer networks that are not physically accessible to the outside world. Such a physical "air gap" between the sensitive data and the outside world completely prevents computer attack or invasion. Unfortunately, authorized data transfers from the computer or computer networks to outside computers are limited to manual transfer on a portable storage medium (e.g., floppy disc or CD).

SUMMARY OF THE INVENTION

The present invention provides an "electronic air gap" between computers. More specifically, the present invention provides a system and method for communicating data in a manner that restricts invasive activities from one computer and/or network from reaching another computer and/or network.

An embodiment of the present invention provides a method for transmitting data. A first data packet containing at least data and an associated first transmission protocol header is received from upstream in the data path. The association between the first transmission protocol header and the data is disabled. A second transmission protocol header with the data is associated with the data. The second transmission protocol header is independent from the first transmission protocol header. A second data packet containing at least the data and the associated second transmission protocol header is sent downstream in the data path. The first protocol is preferably different from the second protocol.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE EXEMPLARY EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
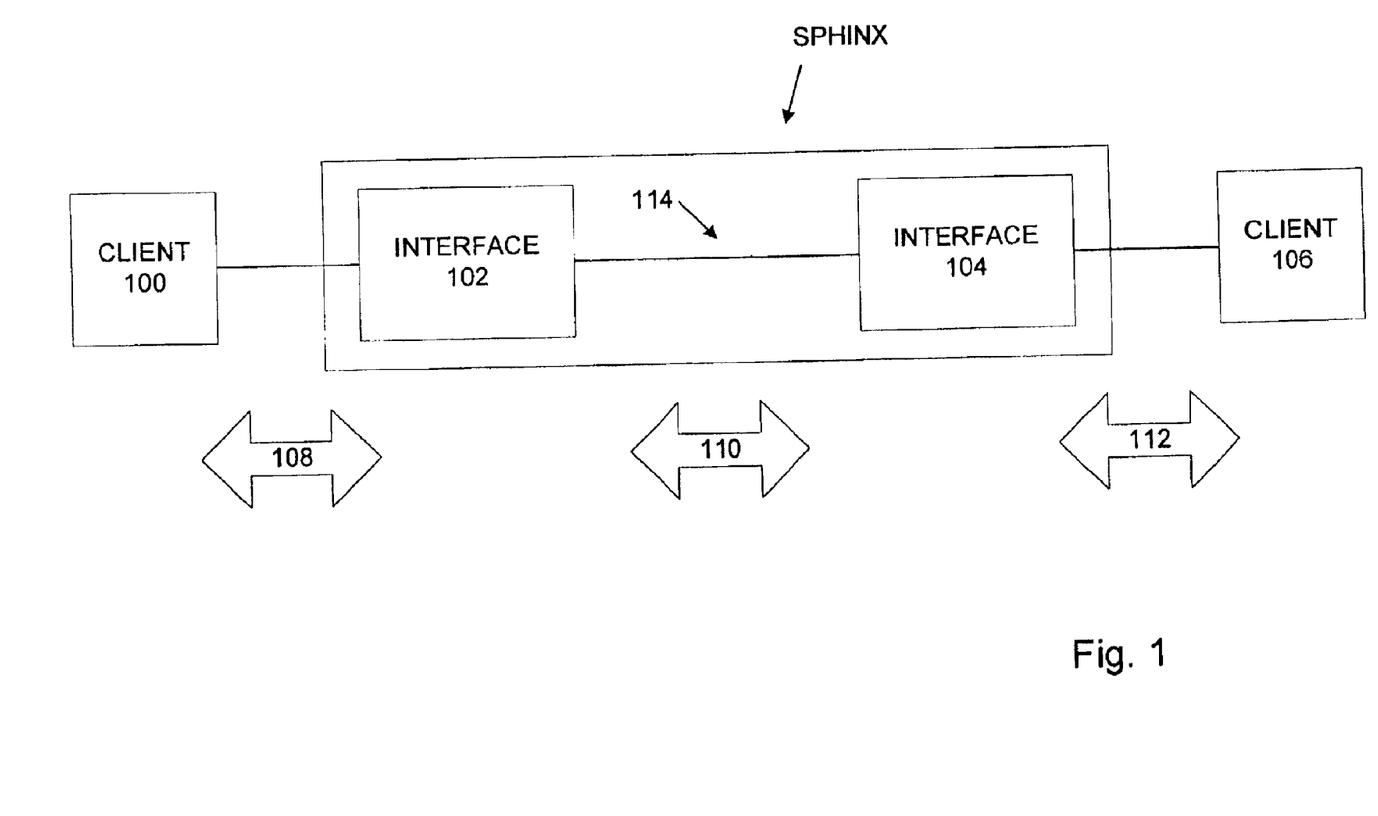
FIG. 1 is a block diagram of an embodiment of the present invention.

Referring now to FIG. 1, an embodiment of the present invention includes a first client 100, a first interface 102, a second interface 104, and a second client 106. First client 100 communicates with first interface 102 in accordance with a first protocol 108. First interface 102 communicates with second interface 104 in accordance with a second protocol 110. Second interface 104 communicates with second client 106 in accordance with a third protocol 112. A secure pipeline 114 connects first interface 102 and second interface 104.

Clients 100 and 106 may be stand alone computers, networks, network servers, or some combination thereof. If networks, all of the computers at client 100 preferably communicate using first protocol 108, while all of the computers at client 106 preferably communicate using third protocol 112.

First and third protocols 108 and 112 are preferably the same, and particularly a TCP/IP suite protocol. Second protocol 110 is preferably different from first and third protocols 108 and 112, and particularly is a IEEE-1394 protocol (otherwise known as FIREWIRE by Apple). However, other protocols may be used.

Figure 2:
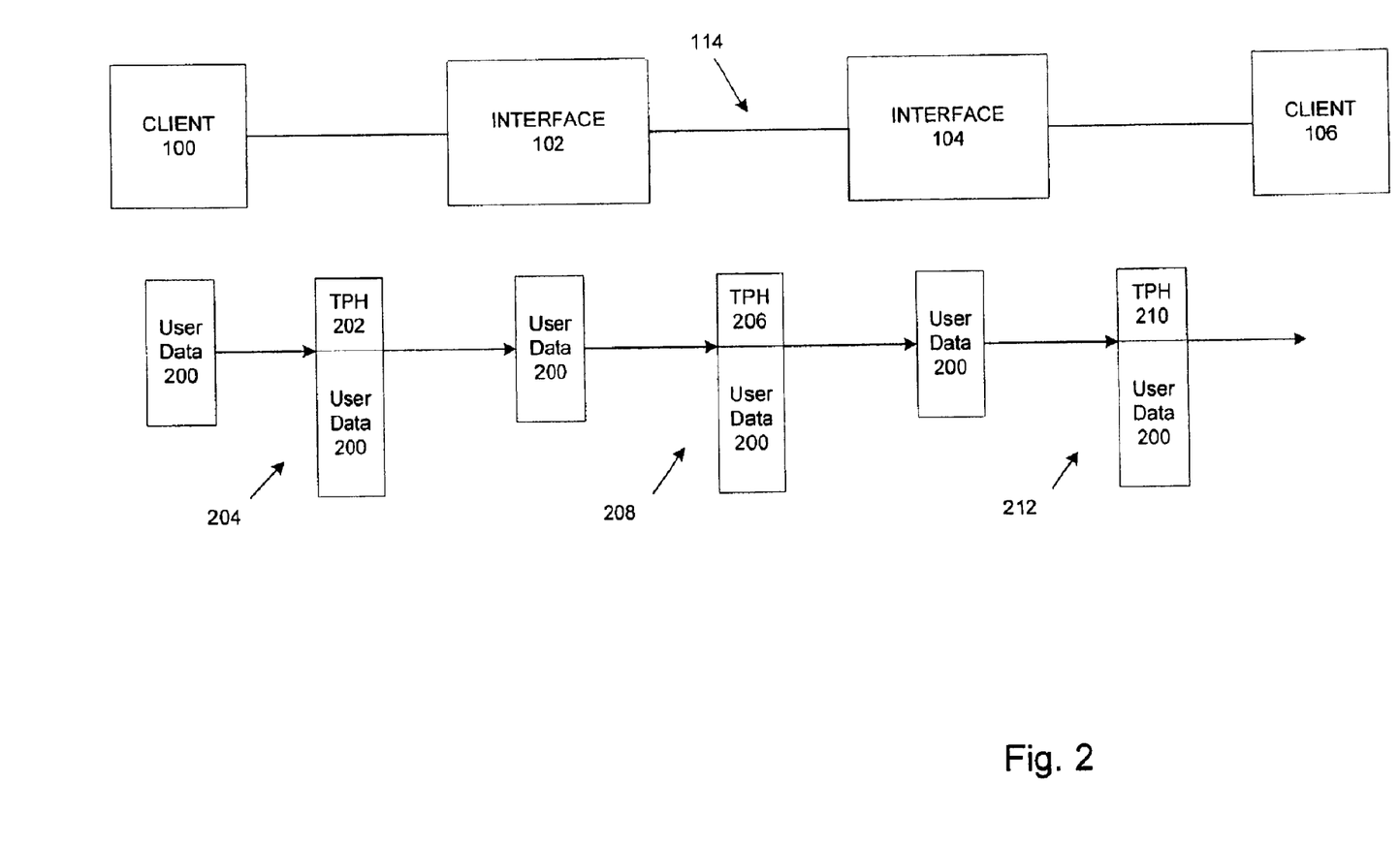
FIG. 2 is a block diagram of the changes to headers as user data moves along a data path according to an embodiment of the present invention.

FIG. 2 shows the movement of user data 200 from client 100 to client 106. By way of reference, user data 200 may be thought of as including a control header and underlying data. By way of non-limiting example, image data includes a bitmap and a bitmap header. User data 200 may, however, be any type of electronic data (text, audio, visual, etc.) or combinations thereof. User data may also be a file of limited size, or streaming data.

To transfer user data 200 from first client 100 to second client 106, an appropriate request is entered at first client 100. First client 100 responds by associating a first TPH 202 with user data (shown in FIG. 2 as a unitary segment 204). First TPH 202 will be consistent with first protocol 108, and preferably contains at least the necessary information to transfer user data 200 from first client 100 to first interface 102, including identifying the intermediate destination of first interface 102.

After receiving user data 200 and associated first TPH 202, first interface 102 disables the association, or disassociates between first TPH 202 and user data 200. Such disabling preferably occurs by simply stripping first TPH 202 away from user data 200. However, the association can be disabled using other methods. By way of non-limiting example, user data 200 could be copied from segment 204, or first TPH 202 is discarded/erased. With the first TPH 202 so disassociated, user data 200 stands alone (or, as discussed in more detail below, may retain one or more non-transport protocol headers, which first protocol 110 preferably views as data).

First interface 102 then associates a second TPH 206 with user data 200 (shown in FIG. 2 as segment 208) and forwards this information to second interface 104. Second TPH 206 will be consistent with second protocol 110, and contain at least the necessary information for first interface 102 to transfer user data 200 to second interface 104, including identifying the intermediate destination of second interface 104. Second TPH 206 is independent from first TPH 202, i.e., second TPH 206 does not contain any information from first TPH 202, or any derivation of information from first TPH 204. Second TPH 206 may also be partially dependent upon information resident at first interface 102; by way of non-limiting example, identification information associated with the first interface 102 could be inserted into second TPH 206 as an identification of the source/originator of second TPH 206.

After receiving user data 200 and associated second TPH 206, the second interface 104 disables the association between second TPH 206 and user data 200. With the second TPH 206 so disassociated, user data 200 stands alone (or may retain one or more non-transport protocol headers, which may be viewed as data by second protocol 110). Second interface 104 then associates a third TPH 210 with user data 200 (shown in FIG. 2 as segment 212) and forwards this information to second client 106. Third TPH 210 will be consistent with third protocol 112, contain at least the necessary information for second interface 104 to transfer user data 200 to second client 106 (including the ultimate destination of second client 106), and may include information taken or derived from resident information on second interface 104.

Preferably, a new TPH is added as soon as the old TPH is disassociated. The invention is not, however, so limited. As discussed below, there may be intermediate processing steps, such as security checks, that precede disassociation and/or association of a new TPH. The interface could also wait for a confirmation signal from a downstream element before proceeding with disassociation and/or association.

It is known that computers may be accessed by manipulating an TPH. In the embodiment above, any manipulation of the TPH is lost when the TPH is disassociated from its associated data. This process of disassociating one TPH and replacing it with another independent TPH provides a type of security against, by way of non-limiting example, TCP/IP pinging through the system.

The use of different protocols between the first and second clients 100 and 106 provides an additional layer of security. By way of non-limiting example, an attack from client 100 would occur using first protocol 108 (which is the first leg of reaching second client 106 through first interface 102). However, first and second interfaces 102 and 104 communicate using second protocol 110 (which is different than first protocol 108 in this embodiment). An attack using the first protocol 108 will not be understood in the second protocol 110.

Figure 3:
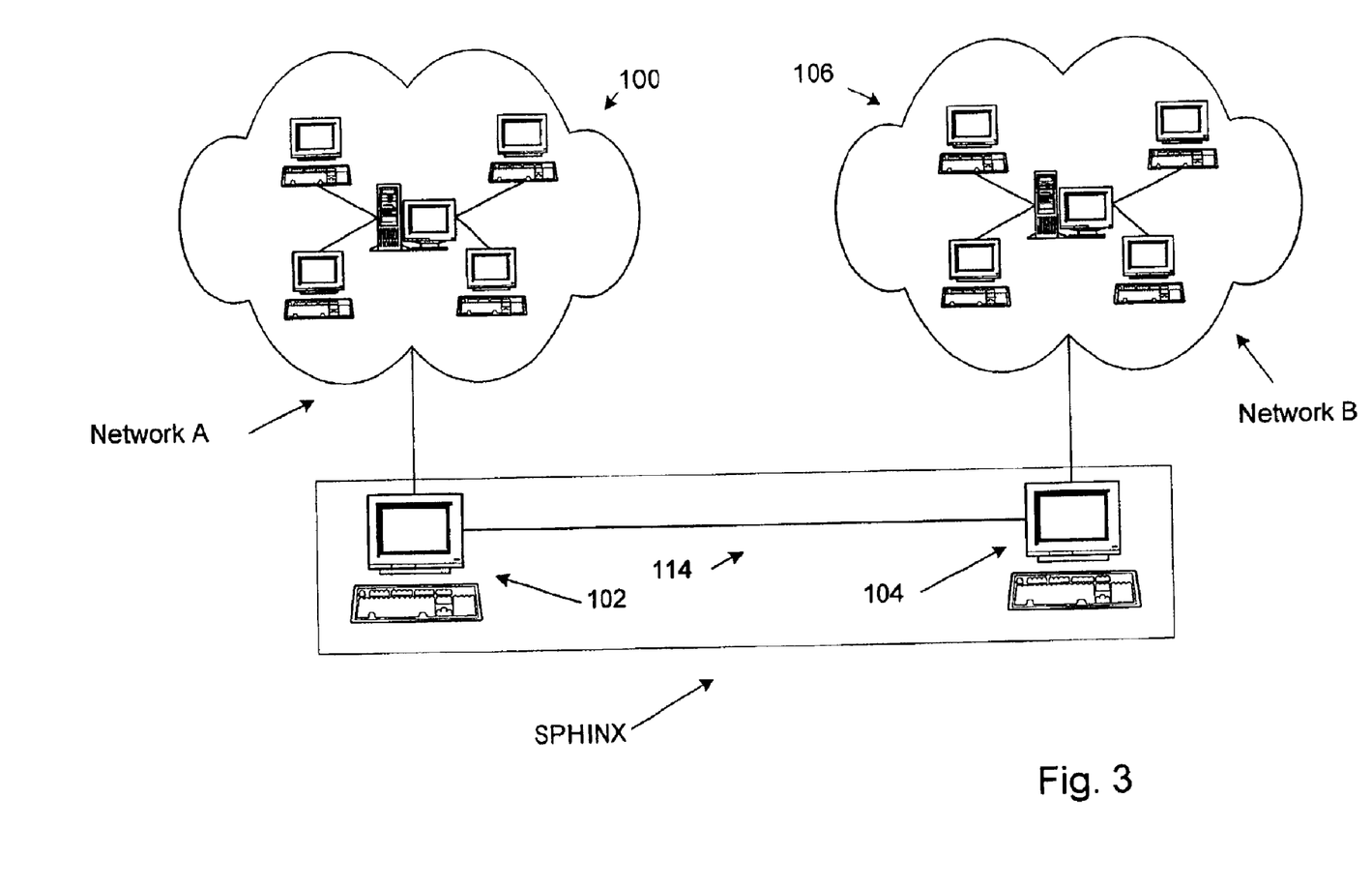
FIG. 3 is a schematic diagram of an embodiment of the present invention.

Also as shown in FIG. 3, interfaces 102 and 104 are preferably stand-alone computers. Secure pipeline 114 connects these two computers. Physically, these two computers and secure pipeline 114 form a Secure Pipeline High-Speed Information Network Exchange ("SPHINX").

In the above embodiment, since only the user data 200 propagates from client 100 to client 106, a large reliance is placed on the individual components of the systems to forward user data 200 to the correct location. However, it may be useful for the user data 200 to propagate through the system with additional control information. Such control information preferably includes at least the final destination of the user data. As discussed below, such control information may also include various types of security information that further enhances the security and integrity of the system as a whole.

An embodiment of the present invention therefore contemplates the use of SPHINX Control Information (SCI) that is associated with the user data. Unlike a TPH, the SCI is not used to transport the user data (and is thus a non-transportation header, although it may take the form of a header), although, as discussed below, it may contain data from which a TPH can be derived. The SCI is also generally considered as part of the data by the transport protocols.

Figure 4:
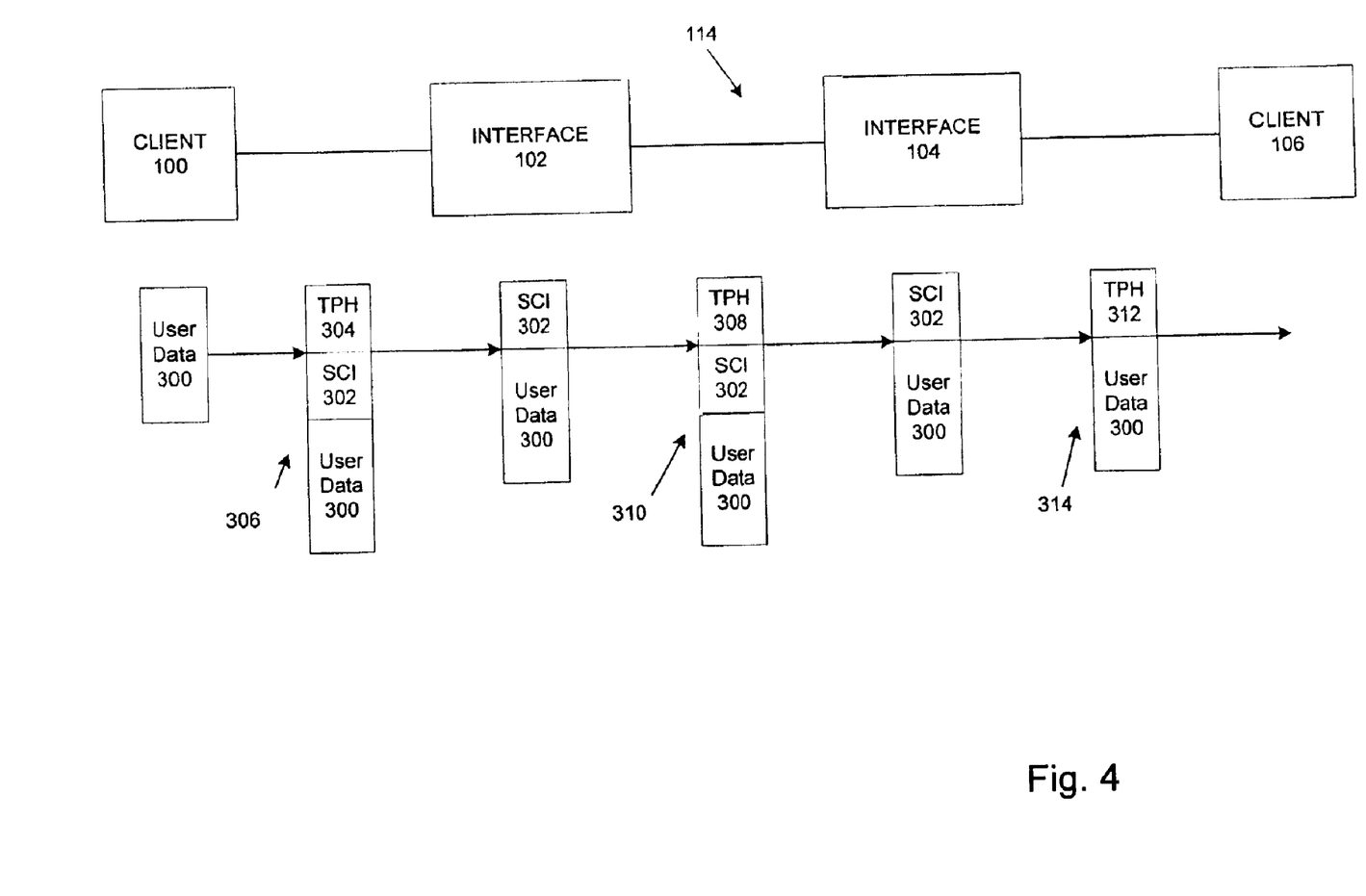
FIG. 4 is a block diagram of the changes to headers as user data moves along a data path according to another embodiment of the present invention.

Referring now to FIG. 4, if a user desires to transfer user data 300 from client 100 to client 106, an appropriate request is entered at client 100. The computer responds by associating a first TPH 304 and a SPHINX control information (SCI) 302 with user data 300 (shown in FIG. 4 as a unitary segment 306). Any SCI discussed herein may be in the form of a header, or considered as data. First TPH 304 will be consistent with first protocol 108, and contain at least the necessary information for client 100 to transfer user data 300 from client 100 to first interface 102. SCI 302 may include final destination information, and preferably includes other security information.

After receiving user data 300, associated first TPH 304 and SCI 302, the first interface 102 disables the association between first TPH 304 and user data 300. With the first TPH 304 so disassociated, user data 300 and SCI 302 stand alone.

First interface 102 then associates a second TPH 308 with SCI 302 and user data 300 (shown in FIG. 4 as segment 310) and forwards this information to second interface 104. Second TPH 310 will be consistent with second protocol 110, and contains at least the necessary information for first interface 102 to transfer user data 300 to second interface 104. As with the preceding embodiment, second TPH 308 is independent from first TPH 304. However, second TPH 308 is preferably at least partially dependent upon the information in SCI 302; by way of non-limiting example, second TPH 308 may incorporate final destination information taken or derived from SCI 302. Second TPH 308 is also preferably dependent on information resident on interface 102.

After receiving user data 300, associated second TPH 308 and SCI 302, the second interface 104 disables the association between second TPH 308 and user data 300, as well as the SCI 302. With the second TPH 308 and SCI 302 so disassociated, user data 300 stands alone. Second interface 104 then associates a third TPH 312 with user data 300 (shown in FIG. 4 as segment 314) and forwards this information to second client 106. Third TPH 312 will be consistent with third protocol 112, and contain at least the necessary information for second interface 104 to transfer user data 300 to second client 106. Third TPH 314 may include information from SCI 302. In the alternative, SCI 302 can remain associated with user data 300.

In the above embodiment, SCI 302 does not change as user data 300 propagates through the system. However, SCI 302 may be modified at each transition (or selected transitions) to reflect the transition. By way of non-limiting example, the SCI may contain a transaction number that is replaced/updated at each node. Security data in SCI 302 may also be modified based upon the implementation and results of various security features that may reside at any particular node or transition point.

Figure 5:
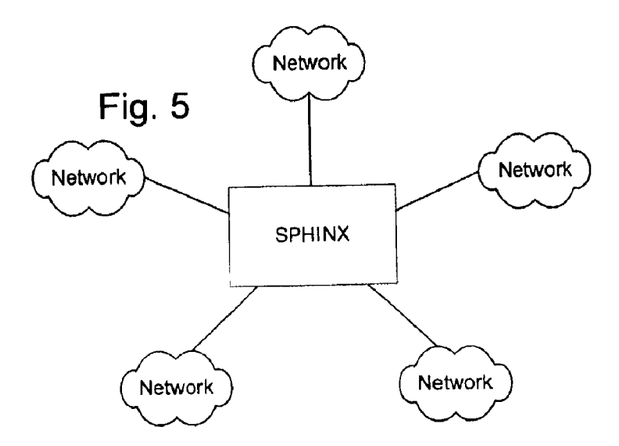
FIG. 5 is a block diagram of an embodiment of the present invention in a star configuration.
Figure 6:
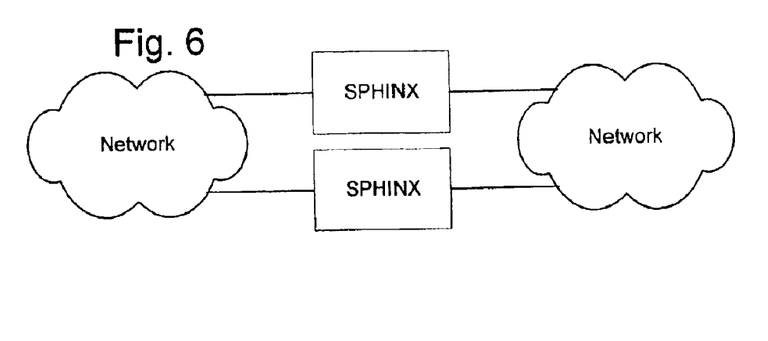
FIG. 6 is a block diagram of an embodiment of the present invention in a redundant configuration.
Figure 7:
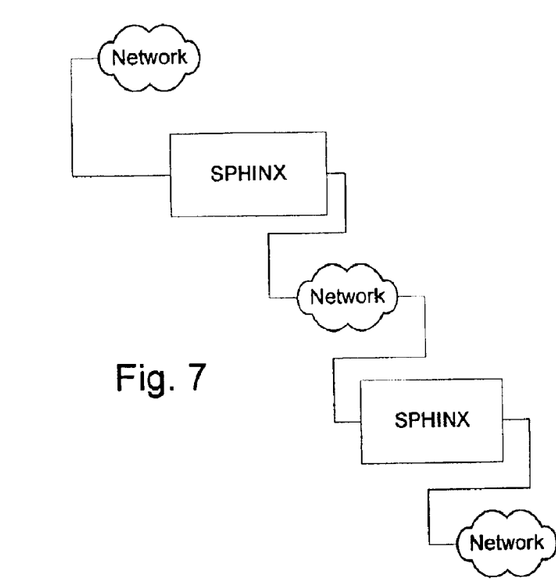
FIG. 7 is a block diagram of an embodiment of the present invention in a waterfall configuration.
Figure 16:
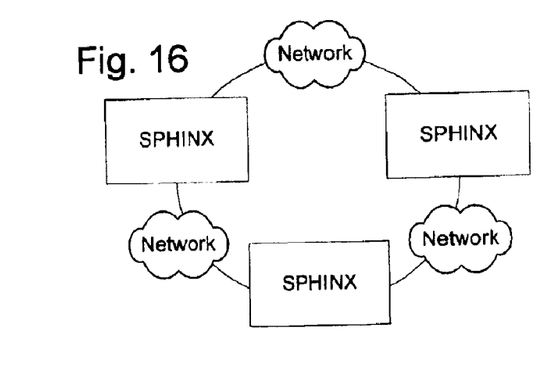
FIG. 16 is a block diagram of the present invention in a ring configuration.

The structures of FIGS. 1 and 3 above may be thought of as a "simple" network configuration, in that they only involve 2 nodes. However, other configurations may be used. By way of non-limiting example, FIG. 5 shows a "star" pattern, FIG. 6 shows a "multiple" pattern (e.g., for fail-over configurations, increasing data throughput, or each dedicated to a specific type of data), FIG. 7 shows a "waterfall" pattern, and FIG. 16 shows a "ring" pattern. Data is transmitted over these configurations in the manner discussed above. Systems with more than two nodes preferably use a SCI with the data to direct the data to the proper final destination. Nodes that are not intended as a receiving node or a relay node may use information in the SCI to ignore the incoming data.

Under current communication standards, it is expected that the first, second, and third protocols are commercially available protocols that are not specific to the use of a SCI. Thus, by way of non-limiting example, the use of a TCP/IP suite protocol by client 100 will not allow for the insertion or use of a SCI (other than as data). Preferably, SPHINX software would also be resident on client 100 or 106 that insert or otherwise modify SCI 302. The SPHINX software can also be used to establish a secure connection between a client and its associated interface.

Figure 8:
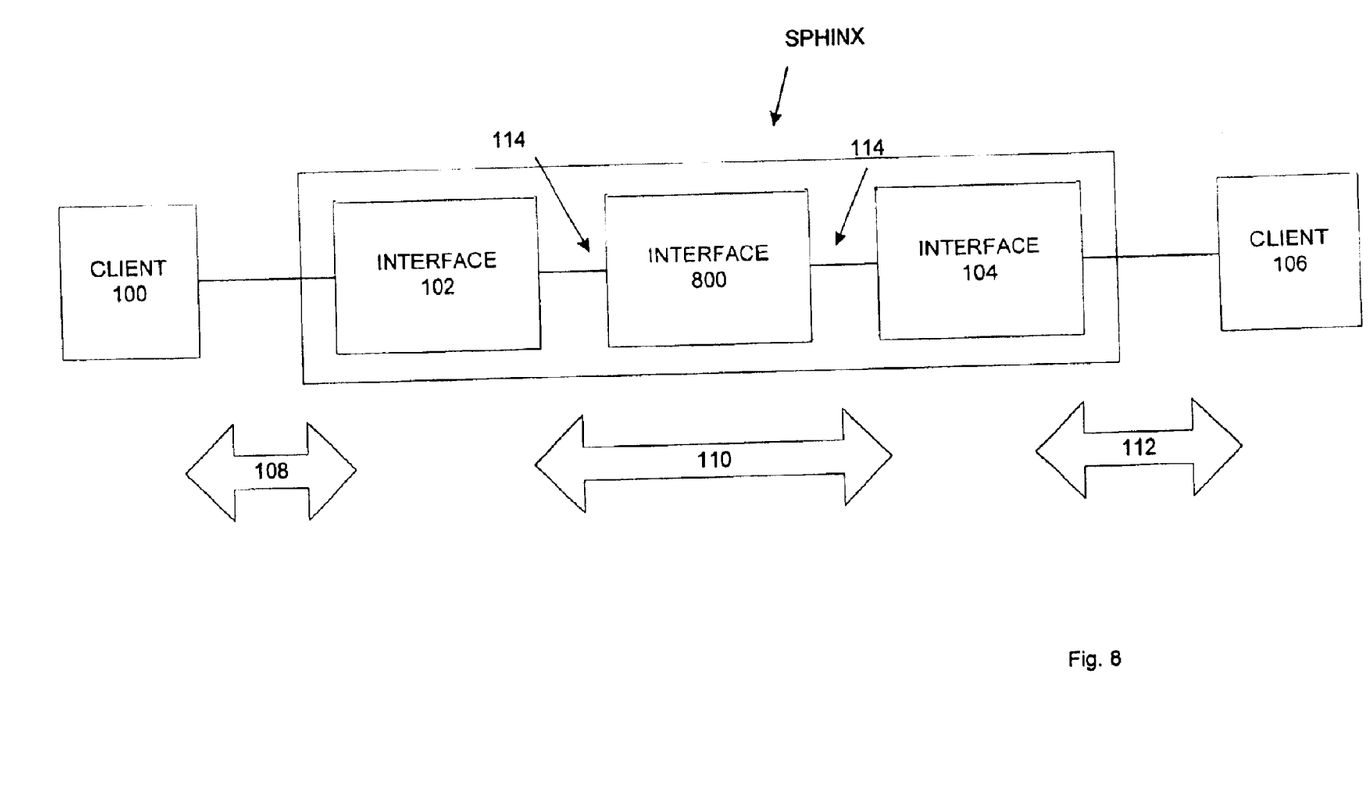
FIG. 8 is a block diagram of another embodiment of the present invention.

Referring now to FIG. 8, the secure pipeline between interface 102 and interface 104 may include a third interface 800, which is preferably a stand alone computer. In a "star" type configuration such as shown in FIG. 5, interface 800 can direct incoming user data to the specific destination nodes. This provides an added layer of security, as nodes that are not the destination nodes will not receive the user data. Interface 800 can also perform various security checks as described below.

Interface 800 preferably does not have the ability to operate in first and third protocols 108 and 112, and particularly can only operate in second protocol 110 and the SPHINX protocol. This is preferably done by not providing interface 800 with network cards (and/or software) that support either first and third protocols 108 and 112 on interface 800, and particularly by only placing network cards for the second protocol 110 and the SPHINX protocol (and/or software) onto interface 800. Preferably, interface 800 has separate network cards corresponding to each interface to which interface 800 connects, such that the transmission must pass through interface 800. This adds an additional level of hardware-based security that will inhibit any attack based on protocols other than allowed protocols, as interface 800 will simply be unable to understand, process, or forward such an attack through to another network.

Interface 800 is preferably a stand alone computer with no direct contact with the outside world, and indirect contact only through interfaces 102 and 104 (and any other interfaces for additional clients). If an attacker could access interface 102 or 104, the protocol barriers, either alone or in combination with other security barriers, preferably prevent the attacker from reaching or interfering with interface 800.

Figure 9:
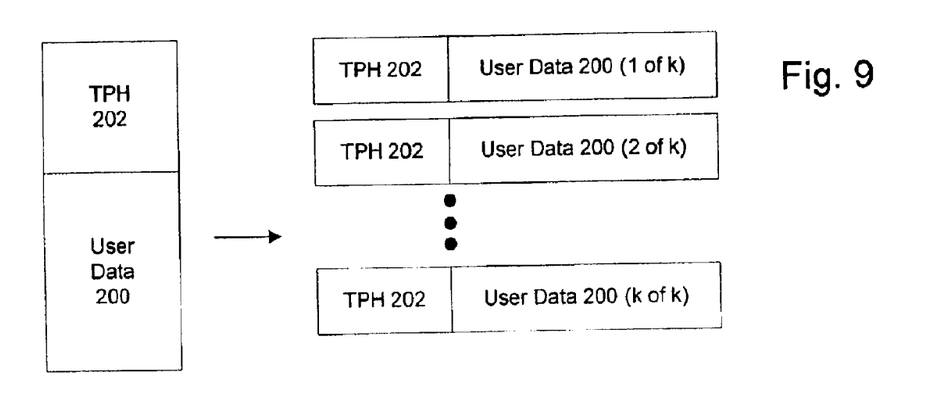
FIG. 9 is a block diagram of a break up of headers and data along intermediate steps in the data path.
Figures 10A, 10B:
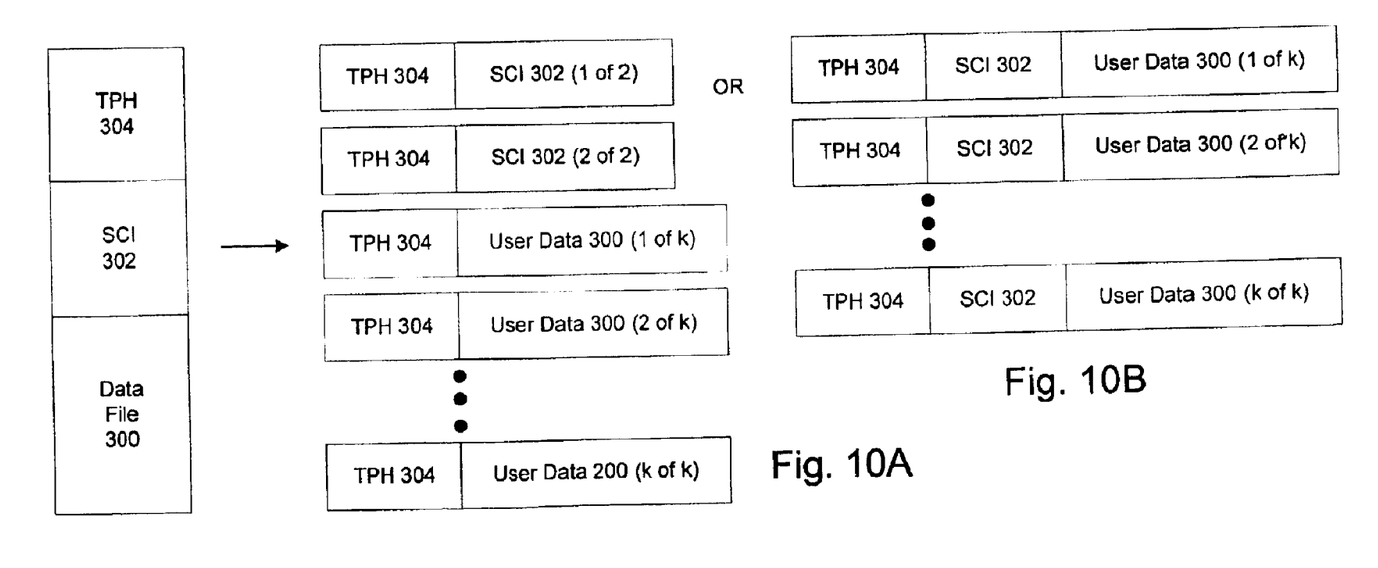
FIGS. 10A and 10B are block diagrams of the break up of headers and data along intermediate steps in the data path.

As is known in the art, fragmentation is the process of breaking up packets so that they do not exceeds the Maximum Transfer Unit (MTU) of the protocol. By way of non-limiting example, the MTU for IEEE-1394 and TCP/IP in the preferred embodiments are 2048 bytes. Each node in the data path may recombine the segments, or pass them through as is. FIG. 9 shows how the transmission from FIG. 2 may be broken into k segments. FIG. 10A shows how the transmission from FIG. 4 may be broken into segments when the SCI is data, while FIG. 10B shows how the transmission from FIG. 4 may be broken into segments when the SCI is a header.

The preferred embodiment preferably includes additional optional security features which further improves the system's resistance to attacks and invasion. Such features will be described by way of non-limiting example with respect to the embodiment of FIG. 4.

Access to the SPHINX pipeline can be restricted through user identification information, such as a user name and password. Such identification information is preferably entered into SCI 302 and checked against a database of identification information at first interface 102 or the third interface 800. These interfaces will reject any attempt to pass data for which the entered identification information does not correspond to an authorized user.

The connection between the data source (e.g., client 100) and its associated interface is preferably a secure line, and particularly a line under Secure Socket Layer (SSL) protocol.

Any request to transfer data preferably includes a source address, embedded in either the TPH or the SCI. Interface 102 and/or interface 800 preferably maintains a database of authorized source addresses. These interfaces can reject any data transfer for which the TPH or SCI evidences an unauthorized source address.

Each request to send data through the SPHINX pipeline is preferably assigned a sequential control number embedded in the SCI 302. Interface 102 or interface 800 can reject any request that either does not include such a control number or includes a number that is not the next in sequence compared with the control number of the previous request. Even if an attacker could "mimic" a source (e.g., have the proper identification information, protocols, TPH and SCI, and SSL access, etc.), it would be difficult for the attacker to determine an appropriate control number in the ongoing sequence to send with the data.

Within the secure pipeline, each node (e.g., interfaces or computers connected to the interfaces) preferably has a database of the other authorized nodes, and can probe other nodes for correct node identification information. A system wide check would thus identify an unauthorized node within the secure pipeline via an either undetectable or unknown node identification information. Such system checks could be through either polling at fixed or random intervals, or by trigger in response to any change in the node configuration (e.g., a node is removed or added onto the system). This ability is preferably inherent in the operation of second protocol 110.

Various security features can also be used in conjunction with the user data itself. By way of non-limiting example, the file name should not contain any non-ASCII characters; the data should be of limited length relative to the processing limitations of second protocol 110; and a Cyclic Redundancy Check (CRC) associated with the user data can evidence whether the user data has been tampered with. User data integrity may be further enhanced using known watermarking and/or digital fingerprinting techniques. First interface 102 or third interface 800 can reject a request for data transfer in response to any of the foregoing.

The data contents can also be scanned for any specific words (that might indicate that this data is not of the type that should be transferred, e.g., "dirty words"), or for viruses. Attachments can also be prohibited by scanning for the header(s) that identify the presence of attachment. Any node in the system can be programmed to scan for the same.

The SPHINX (including all interfaces) is preferably physically secured in a locked computer rack in a highly controlled area with other missions critical hardware (e.g., database servers). Access should be limited to authorized personnel, whom should only be able to access any of the interfaces by their keyboards (i.e., there is preferably no remote access to the interfaces). Such physical security prevents tampering with the SPHINX hardware.

FIGS. 1–15 illustrate a preferred embodiment of the present invention, which corresponds to that of FIGS. 3 and 4. Client 100 and client 106 are networks that operate using the same TCP/IP protocols as the first and third protocols 108 and 112. Interfaces 102, 104, and 800 are stand alone computers that operating using IEEE-1394 protocol as the second protocol 110, and are locked within a cabinet between clients 100 and 106 (Networks A and B). Interface 800 only operates using the SPHINX protocol and the IEEE-1394 protocol, and does not have network cards to support TCP/IP. SPHINX protocols are installed at each node to propagate user data 300 from Network A to Network B.

Figures 11, 12:
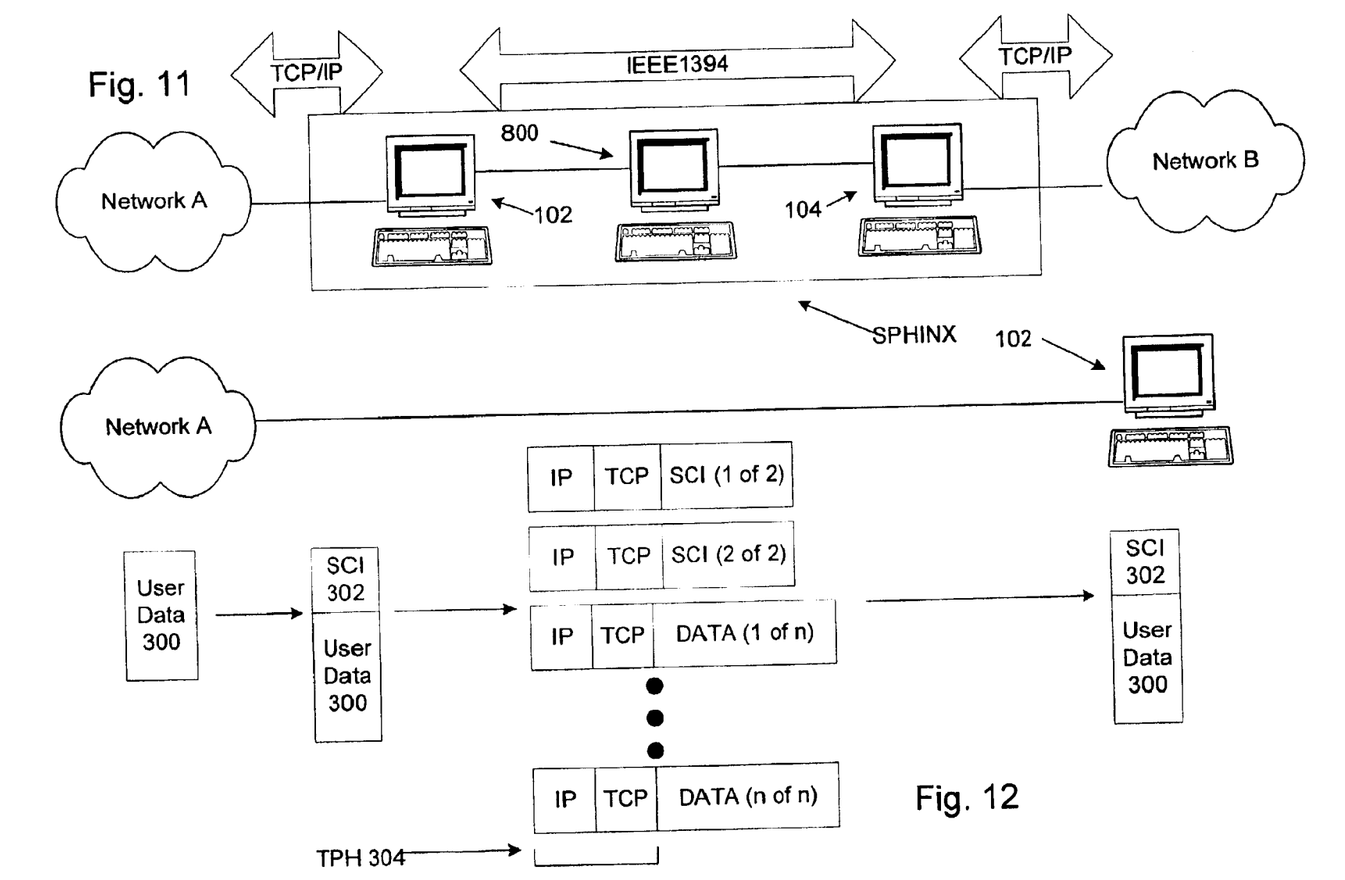
FIGS. 11–15 are block diagrams showing the movement of user data from one network to another through various interfaces pursuant to an embodiment of the present invention.
Figure 13:
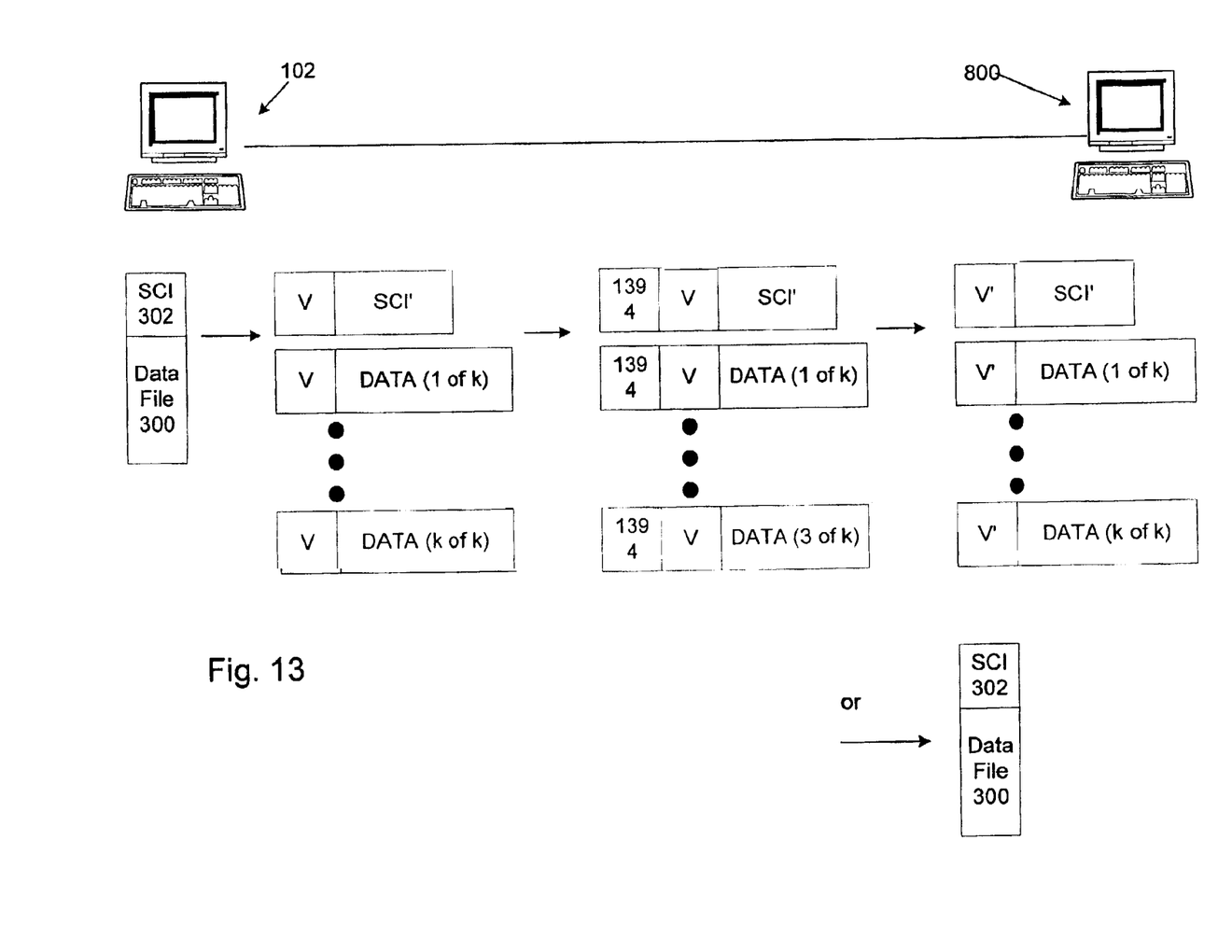
Figure 14:
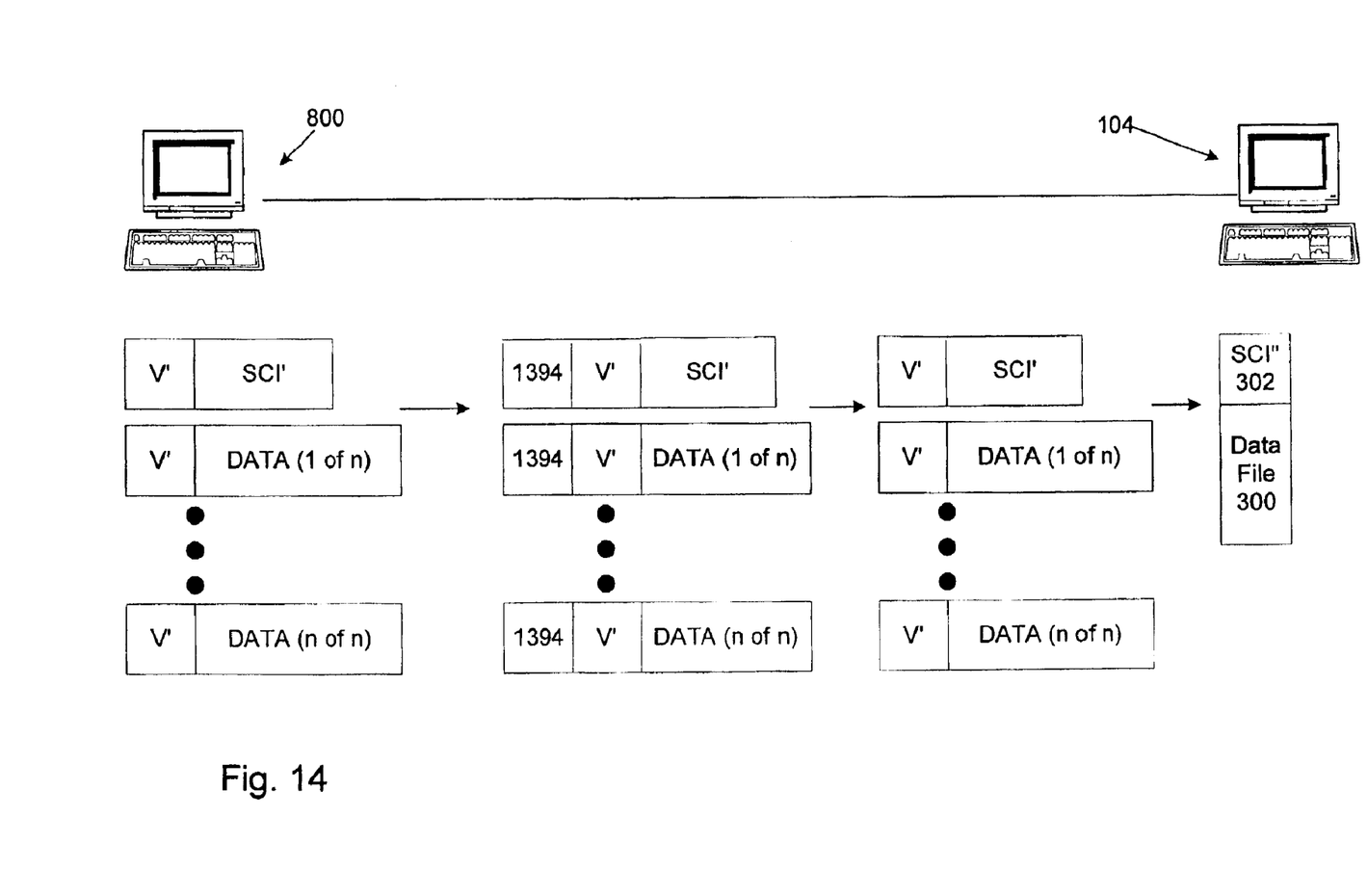

When a user wants to transfer user data from Network A to Network B, the user enters an appropriate user name and password at an authorized Network A terminal. The SPHINX protocol will verify the identification information, set up a secure SSL connection with interface 102, and associate an appropriate SCI with the user data. In the preferred embodiment, the SCI is data. The TCP/IP protocol breaks the SCI and user data into at least two segments (one for the SCI and one for the user data), plus any additional segments as required by the size of SCI and the user data. FIG. 11 shows an SCI of 2 segments and user data of n segments); the size of each segment is consistent with the requirements of the TCP/IP protocol. Each segment is associated with a TPH that includes an IP header and a TCP header.

Once interface 102 receives the segments (FIG. 13), it strips the TPH (IP and TCP headers) and recombines the data segments into their original form. The SPHINX program at interface 102 will separate the data into segments consistent with the requirements of the IEEE-1394 protocol. The SCI is updated to reflect that interface 102 is now the source of the user data. An internal tracking header (with transaction data) is associated with each segment. The FIREWIRE protocol associates a IEEE-1394 TPH with each segment and sends the segments to interface 800. The IEEE-1394 TPH is independent from the TCP/IP TPH that delivered the user data to interface 102.

Once interface 800 receives the segments (FIG. 14), it disassociates the IEEE-1394 TPHs, updates the tracking header, associates a new IEEE-1394 TPH with the segments, and sends them to interface 104. For a batch transfer that is not "on the fly," interface 800 may recombine the SCI and user data before breaking them up again for transfer to interface 104. Interface 800 can also perform any and all of the various security checks noted above before the data passes to interface 104.

Figure 15:
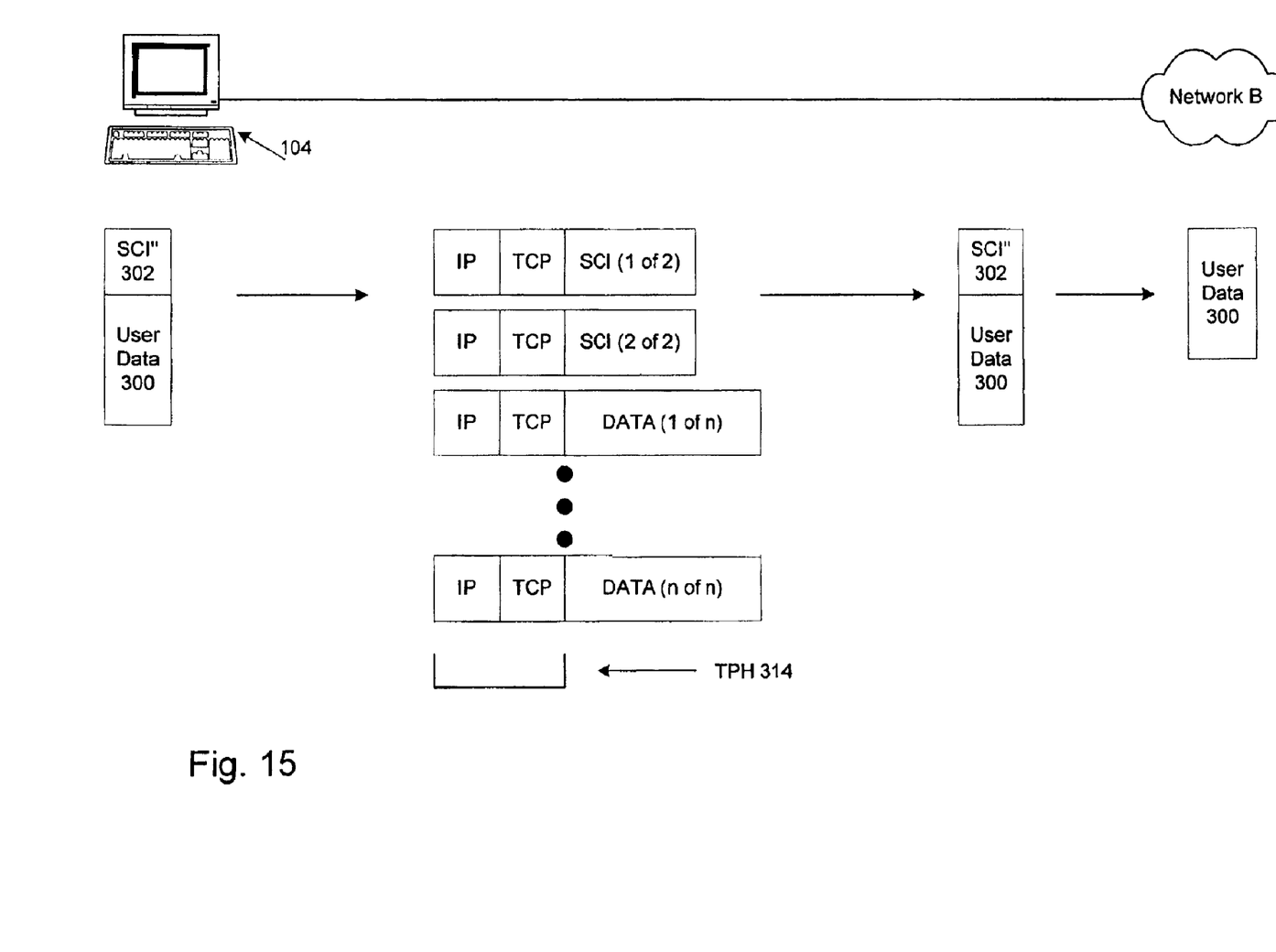

In FIG. 15, interface 104 disassociates the IEEE-1394 TPH (via the IEEE-1394 protocol), disassociated the tracking header, updates the SCI, and recombines the SCI and user data for delivery to Network B. A TCP/IP header is added to the user data for transport to Network B.

In conjunction with the above examples and security checks, the data fields of the various headers and information for TCP/IP and IEEE-1394 include, by way of non-limiting example:

1394 header and/or SPHINX control information:
1. Source interface (A, B, C, . . . each network has a unique letter)
2. Destination interface (A, B, C, . . . each network has a unique letter)
3. Transaction ID (one up number, 1,2,3, . . . )
4. Current Command (Begin File Transaction Header, Next File Packet, End File Packet, etc.)
5. Information Type (email, file transfer, satellite image, etc.)
6. Classification (unclassified, secret, top secret, etc.)
7. Compartment (handling instructions within a classification. For example, Great Britain or US can see this information)
8. Source/Destination Interface Type (FTP, MAIL, etc . . . ) this is a category grouping of the information type
9. CRC (Cyclic Redundancy Check) on the user data
A. Network A to Interface 102 via TCP/IP
   a. SEND Single Command Character to indicate file transfer request b. SEND SPHINX Transaction Header
  i. SEND Information Type
  ii. SEND Source Classification/Compartment
  iii. SEND Destination Network Bit Mask (1 or more)
  iv. SEND Direct Boolean Request (Should Interface 104 store first, or send directly to Network)
  v. SEND OnFly Boolean Request (Should Interface 104 or 800 check for "dirty" words before, or on-the-fly)
  vi. SEND File Count
c. Send for each file
  i. SEND Destination Path Length
  ii. SEND Destination Path
  iii. SEND File Size Length
  iv. SEND File
  v. RECEIVE Transaction ID
d. RECEIVE STATUS
B. Interface 102 to Interface 800 via IEEE-1394
a. RECEIVE Global Transaction Info
b. If Direct:
  i. RECEIVE FILE, and at the same time:
    1. SEND Begin packet with:
      a. OnFly Boolean
      b. Destination Network Bit Mask
      c. Destination Path
    2. SEND File broken into packets
    3. RECEIVE Response Status every x number of packets to make sure things are proceeding on the other end
    4. SEND End File Packet
  ii. RECEIVE Status from Interface 800
  iii. SEND back status to Interface 102
c. If Not Direct:
  i. RECEIVE FILE, and for each:
    1. SEND Begin packet with:
      a. OnFly Boolean
      b. Destination Network Bit Mask
      c. Destination Path
    2. SEND File broken into packets
    3. RECEIVE response from all in destination network Bit Mask
    4. RECEIVE Response Status every x number of packets to make sure things are proceeding on the other end
    5. SEND End File Packet
  ii. RECEIVE Status from Interface 800
  iii. SEND back status to Interface 102
C. Interface 800 to Interface 104 via FIREWIRE 1394
a. If On-Fly:
  i. RECEIVE Begin packet
  ii. SEND Begin packet
  iii. RECEIVE File packets, and send them to Interface 104 (and any other additional interfaces as may be indicated by the Bit Mask) after verification
  iv. SEND RESPONSE packets to Interface 102 every x number of packets, and when received from Interface 104 (and any other additional interfaces as may be indicated by the Bit Mask)
  v. RECEIVE End File Packet and send to Interface 104 (and any other additional interfaces as may be indicated by the Bit Mask)
b. If Not On-Fly
  i. RECEIVE Begin packet
  ii. RECEIVE File packets, and store in memory after verification
  iii. SEND RESPONSE packets to Interface 102 every x number of packets, and when they are received by Interface 104 (and any other additional interfaces as may be indicated by the Bit Mask)
  iv. RECEIVE End File Packet
  v. SEND Begin packet to Interface 104 (and any other additional interfaces as may be indicated by the Bit Mask)
  vi. RECEIVE response from all in destination network Bit Mask
  vii. SEND File packets to Interface 104 (and any other additional interfaces as may be indicated by the Bit Mask) and RESPONSE packets to Interface 102 every x number of packets
  viii. SEND End packet
c. RECEIVE Status from Interface 104 (and any other additional interfaces as may be indicated by the Bit Mask)
d. SEND Status back to Interface 102
D. Interface 104 from Interface 800 via FIREWIRE 1394
a. RECEIVE Begin packet
b. RECEIVE File packets, and send back RESPONSE packets to Interface 800 every x number of packets.
c. RECEIVE End packet
d. SEND Status to Interface 800

The above embodiment demonstrates how user data can be transported from Network A to Network B. Of course, by using the same technique, Network B could send user data to Network A.

The above descriptions have been primarily directed toward sending user data from one client to another client. However, user data can be sent from one client to multiple clients by making enough copies of the user data to provide one copy to each of the destination clients. Copying can occur at the originating client, first interface 102, or interface 800. If at the originating client, then each copy of the user data can be sent separately as set forth above. If at the first interface 102 or interface 800, then only the original copy of the user data is sent from the original client, and the multiple destination addresses are preferably stored in the associated SCI.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of transmitting data through a path, comprising:

receiving, from upstream in the path, a first data packet containing at least data and an associated first transmission protocol header;

disabling the association between the first transmission protocol header and the data;

associating a second transmission protocol header with the data, the second transmission protocol header being independent from the first transmission protocol header; and sending, downstream in the path, a second data packet containing at least the data and the associated second transmission protocol header.

2. The method of claim 1, wherein:

said receiving comprises receiving the data and the first transmission protocol header consistent with a first protocol;

said sending comprises sending the data and the associated second transmission protocol header consistent with a second protocol, the first protocol being different from the second protocol.

3. The method of claim 1, further comprising:

the first data packet including control information, the control information including an ultimate destination of the data;

generating the second transmission protocol header based at least partially on the contents of the control information;

the second data packet including the control information.

4. The method of claim 1, further comprising modifying, after said receiving and before said sending, the control information based at least partially on identification information associated with a node at which said generating occurs.

5. The method of claim 1, further comprising establishing an encrypted communication line to transmit the data.

6. The method of claim 2, further comprising a first network that communicates consistent with the first protocol, said receiving further comprising receiving the data from the first network.

7. The method of claim 1, further comprising performing a security check, including at least one of:

determining whether a request to transfer the first data packet is from an unauthorized user;

determining whether the first data packet is from an unauthorized source;

determining whether a control number of the first data packet is improper;

determining whether an unauthorized node has access to the data path;

determining whether a name of the data is improper;

determining whether a length of the data is improper;

determining whether the contents of the data have been tampered with; and determining whether the first data packet contains any improper content.

8. A method of transmitting data from a first client to a second client, comprising:

first receiving, at a first interface from said first client, a first data packet including at least the data and an associated first transmission protocol header;

first disabling an association between the first transmission protocol header and the data;

first associating a second transmission protocol header with the data, the second transmission protocol header being independent from the first transmission protocol header;

first sending, from the first interface to a second interface, a second data packet including at least the data and the associated second transmission protocol header;

second receiving, at the second interface from the first interface, the second data packet;

second disabling an association between the second transmission protocol header and the data;

second associating a third transmission protocol header with the data, the third transmission protocol header being independent from the second transmission protocol header; and second sending, from the second interface to the second client, a third data packet including at least the data and the associated third transmission protocol header.

9. The method of claim 8, wherein:

said first receiving comprises receiving the data and the first transmission protocol header consistent with a first protocol;

said first sending comprises sending the data and the associated second transmission protocol header consistent with a second protocol; and said second sending comprising sending the data and the associated third transmission protocol header consistent with a third protocol;

wherein the second protocol is different from the first protocol and the third protocol.

10. The method of claim 9, wherein the first and third protocols are identical.

11. The method of claim 8, further comprising performing a security check, including at least one of:

determining whether a request to transfer the data is from an unauthorized user;

determining whether the first data packet is from an unauthorized source;

determining whether a control number of the first data packet is improper;

determining whether an unauthorized node has access to the data path;

determining whether a name of the data is improper;

determining whether a length of the data is improper;

determining whether the contents of the data have been tampered with; and determining whether the first data packet contains any improper content.

12. A method of transmitting data, comprising:

first receiving, at a first interface, at least the data and an associated first transmission protocol header consistent with a first protocol;

first disabling an association between the first transmission protocol header and the data;

first associating a second transmission protocol header with the data, the second transmission protocol header being independent from the first transmission protocol header;

first sending, from the first interface to a second interface, at least the data and the associated second transmission protocol header consistent with a second protocol, the second protocol being different from the first protocol;

second receiving, at the second interface, the data and an associated third transport protocol header consistent with the second protocol; second disabling an association between the third transport protocol header and the data;

second associating a fourth transmission protocol header with the data, the fourth transmission protocol header being independent from the third transmission protocol header; and second sending, from the second interface to the client, at least the data and the associated fourth transmission protocol header.

13. The method of claim 12, wherein the second transmission protocol header is the third transmission protocol header.

14. The method of claim 12, further comprising, between said first sending and said second receiving:
third receiving, at a third interface between the first and second interfaces, at least the data and an associated second transmission protocol header consistent with the second protocol;
third disabling an association between the second transmission protocol header and the data;
third associating the third transmission protocol header with the data consistent with the third protocol;
third sending, from the third interface to the second interface, at least the data and the associated third transmission protocol header.

15. A system for transmitting data, comprising:
a first interface capable of receiving, from upstream in a data path, data with a first transport control header, said first transport control header being consistent with a first protocol;
said first interface being capable of substituting said first transport control header with a second transport control header consistent with a second protocol, and sending at least said data and said second transport header downstream in said data path;
said second transport control header being independent of said first transport control header; and
said first protocol being different from said second protocol.

16. A device for securely transmitting data, comprising:
a plurality of interface computers;
a central computer connected to each of said plurality of interface computers, and communicating with each of said plurality of interface computers using an internal protocol;
each of said plurality of interface computers being configured to receive a data packet including at least date and an external transport protocol header, said external transport protocol header being consistent with one of a plurality of external protocols different from said internal protocol;
each of said plurality of interface computers being configured to remove said external transport protocol header from said data and to associate an internal transport control header with the data, said internal transport control header being consistent with said internal protocol and independent of said external transport control header;
said central computer being configured to relay said data from a receiving one of said plurality of interface computers to at least a destination one of said plurality of interface computers using said internal protocol.

17. The device of claim 16, further comprising said central computer being configured to substitute said internal transport control header with another internal transport control header consistent with said internal protocol.

18. The device of claim 16, further comprising:
each of said plurality of interface computers being configured to disassociate one of said internal transport protocol header and said another internal transport control header from said data and to associate another external transport control header with the data, said another external transport control header being consistent with one of said plurality of external protocols and independent of said external transport control header and said internal transport control header.

19. The device of claim 16, wherein said central computer is electronically isolated from direct contact with the outside world.

20. The device of claim 16, wherein said one of said plurality of external protocol is a TCP/IP protocol.

21. The device of claim 16, wherein said internal protocol is a IEEE-1394 protocol.

22. The device of claim 16, wherein at least one of said central computer and said plurality of interfaces will not pass said data if at least one of the following abnormalities are detected: the data originates from an unauthorized source; a control number associated with the data is incorrect; an unauthorized node can communicate with one of said plurality of interfaces, a file name is improper, a file length is improper, the file contents have been tampered with, and the file content is improper.

23. The device of claim 16, wherein said central computer is not configured to operate consistent with said external protocol.

24. The device of claim 16, said central computer being configured to duplicate said data and to relay said data to at least two destination ones of said plurality of interface computers.

25. A device for transmitting data, comprising:
a first computer having a first network card for a first protocol and a second network card for a second protocol;
a second computer having a third network card for said second protocol and a fourth network card for a third protocol;
said first computer being configured to receive information from a first node, external to said device, through said first network card;
said first and second computers being configured to communicate internally within said device through said second and third networking cards;
said second computer being configured to send at least a portion of said information to a second node, external to said device, through said fourth network card; and
said second protocol being different from said first and third protocols.

26. The device of claim 25, further comprising:
a third computer having fifth and sixth network cards for said internal protocol, said first and third computers communicating internally within said device through said second and fifth networking cards, and said third and second computers communicating internally within said device through said third and sixth network cards; and
said third computer being unable to operate in said first and third protocols.

27. The device of claim 25, further comprising:
said information including at least an originating transport protocol header consistent with said first protocol and data;
said at least a portion of said information including at least said a terminating transport control header consistent with said third protocol and said data; and
said originating transport control header being independent from said terminating transport control header.

* * * * *